UNITED STATES PATENT OFFICE.

EMILE BRONNERT, OF MULHOUSE, ALSACE LORRAINE, FRANCE.

PROCESS FOR THE PRODUCTION OF HIGH PERCENTAGE SULFITE CELLULOSE.

1,392,047.  Specification of Letters Patent.  Patented Sept. 27, 1921.

No Drawing.  Application filed September 13, 1920.  Serial No. 409,976.

*To all whom it may concern:*

Be it known that I, EMILE BRONNERT, a citizen of the Republic of France, residing at 1 Quai du Barrage, in Mulhouse, Alsace Lorraine, France, have invented certain new and useful Improvements in Processes for the Production of High Percentage Sulfite Cellulose, of which the following is a specification.

The present process for the production of a sulfite cellulose rich in pure cellulose, is based substantially upon the fact that the wood, prior to the usual boiling with bisulfite, is subjected to a treatment with diluted sulfuric acid, whereby the wood lignin is so decomposed that it is thoroughly dissolved during the subsequent boiling with sulfite lye.

In the manufacture of cellulose according to Mitscherlich by means of calcium bisulfite, or according to Ritter-Kellner with calcium magnesium bisulfite made from dolomite a certain quantity of incrustation (hemi-celluloses) still remains adherent to the product, which in contradistinction to the pure so-called α cellulose is more or less easily soluble in about 20% alkali.

The cellulose can certainly be successfully freed from a further portion of these incrustations if, after running off the sulfite solution, the material be subjected at about 115° C. to boiling with diluted soda solution, caustic soda lye or better still with a suitable mixture of both, pretty much in the same way as is customary when scalding or securing cotton.

It has also been proposed to employ in the first place a kind of saponification and opening up of the wood substances, generically termed incrustations, by boiling with alkali and then removing the substances still remaining by boiling with sulfite. However the success hereby realized has not met the expectations entertained.

According to German specification 237,081, in order to obtain cellulose for the production of paper, wood is subjected to a preliminary treatment with very weak caustic soda solution or diluted acid, in that the wood is macerated or lixiviated in an open receptacle for such time until the mass has lost one half of its weight, whereupon the wood thus preliminarily treated is boiled under high pressure with caustic soda lye or acid solution. The selective use of caustic soda or acid, not only during the initial treatment but also on boiling, constitutes however precisely a sharp difference between that already known process and the present process according to which in the first place lixiviation is not effected without pressure, but rather a mere separation is effected by the acid treatment, in such wise, that the ingredients of the wood capable of lixiviation are then first dissolved by the following bisulfite boiling.

According to Willstätter the separation of pure cellulose from incrustations by means of concentrated hydrochloric acid is just as little suited for technical use upon a large scale.

According to an observation made from another aspect the incrustations of the wood are bound in the substance of the wood in a glucoside-like manner. Hence in the manner commonly known in connection with glucosides a decomposition of the glucoside-like combination can be effected by means of acids, as for example 0.5–0.7% sulfuric acid. The lignin separated off from the wood substance, the so-called lingo cellulose, should then be adapted to be extracted in a but little altered form by such solvent as acetic acid.

Now according to the present process success has been secured, under utilization of this observation in obtaining a cellulose with an astonishingly high percentage of the alone valuable α-cellulose (up to about 99%), when in a first working process by treating the wood, first of all prepared in the usual manner, by means of diluted about 1% sulfuric acid under pressure, at about 115° C., the hydrolizing of the different combinations is effected, whereupon the acid is run off for fresh use if necessary, the mass remaining behind being neutralized and, as a second working process, a bisulfite boiling of the usual strength (3–3, 5% $SO_2$) is immediately allowed to follow at 120° C., for instance.

The duration of the boiling can, by the new process, be reduced to from two thirds to one half of the time otherwise necessary. The control of the boiling and the removal of the dissolved stuffs can be hereby effected in the simplest manner.

The progress of the dissolving process can be easily determined by observing the diminution in the percentage of sulfurous acid, in the boiling lye also by taking test samples of the cellulose and testing its percentage of α-cellulose.

What I claim is:—

A process for the production of high percentage sulfite cellulose, characterized by the fact that under low pressure an opening up of the material by boiling with diluted, say 1% sulfuric acid, is allowed to precede the usual boiling of the already prepared wood material with calcium bisulfite or magnesium calcium sulfite lye under pressure.

In witness whereof I have hereunto signed my name in the presence of two subscribing witnesses.

EMILE BRONNERT.

Witnesses:
L. R. LE SALIS,
M. SCHLUMBURGER.